United States Patent
Evans

(10) Patent No.: US 7,073,831 B2
(45) Date of Patent: Jul. 11, 2006

(54) BUMPER WITH CRUSH CONES AND ENERGY ABSORBER

(75) Inventor: Darin Evans, Wixom, MI (US)

(73) Assignee: NetShape International LLC, Novi, MI (US)

(*) Notice: Subject to any disclaimer, the term of this patent is extended or adjusted under 35 U.S.C. 154(b) by 72 days.

(21) Appl. No.: 10/874,447

(22) Filed: Jun. 23, 2004

(65) Prior Publication Data

US 2005/0285418 A1    Dec. 29, 2005

(51) Int. Cl.
B60R 19/34 (2006.01)
(52) U.S. Cl. .................. 293/155; 293/133; 293/121; 293/102
(58) Field of Classification Search .............. 293/102, 293/120, 121, 110, 132, 136, 155, 133; 296/187.03, 296/187.09, 187.11
See application file for complete search history.

(56) References Cited

U.S. PATENT DOCUMENTS

| | | |
|---|---|---|
| 2,903,289 A | 9/1959 | Klix |
| 3,011,602 A | 12/1961 | Ensrud et al. |
| 3,231,454 A | 1/1966 | Williams |
| 3,638,985 A | 2/1972 | Barton et al. |
| 3,778,093 A | 12/1973 | Renner |
| 3,877,741 A | 4/1975 | Wilfert et al. |
| 3,933,387 A | 1/1976 | Salloum et al. |
| 3,938,841 A | 2/1976 | Glance et al. |
| 3,995,901 A | 12/1976 | Filbert, Jr. et al. |
| 4,022,505 A | 5/1977 | Saczawa, Jr. |
| 4,079,975 A | 3/1978 | Matsuzaki et al. |
| 4,106,804 A | 8/1978 | Scrivo |
| 4,386,799 A * | 6/1983 | Molnar ............... 293/120 |
| 4,413,856 A | 11/1983 | McMahan et al. |
| 4,830,418 A | 5/1989 | Gest |
| 5,080,411 A * | 1/1992 | Stewart et al. ............ 293/122 |
| 5,114,198 A * | 5/1992 | Yamashita et al. ......... 293/120 |
| 5,290,078 A * | 3/1994 | Bayer et al. ............... 293/120 |
| 5,293,973 A | 3/1994 | Thum |
| 5,399,406 A | 3/1995 | Matsuo et al. |
| 5,518,802 A | 5/1996 | Colvin et al. |
| 5,584,518 A | 12/1996 | Frank et al. |
| 5,725,266 A | 3/1998 | Anderson et al. |
| 5,731,062 A * | 3/1998 | Kim et al. ............... 428/175 |
| 5,803,514 A | 9/1998 | Shibuya et al. |

(Continued)

FOREIGN PATENT DOCUMENTS

DE    4239460 A1    5/1994

(Continued)

Primary Examiner—D. Glenn Dayoan
Assistant Examiner—Greg Blankenship
(74) Attorney, Agent, or Firm—Price, Heneveld, Cooper, DeWitt & Litton LLP

(57) ABSTRACT

A tubular bumper beam includes mounts for mounting to a vehicle frame and a crush cone in front of each mount. Each crush cone includes a flange engaging a front wall of the beam and includes a tube section extending through the front wall into engagement with a rear wall of the beam. A thermoformed energy absorber includes ridges engaging horizontal channels in the face and recesses receiving the flanges of the crush cones. The energy absorber is thermoformed to include crush boxes. At least two crush boxes include adjacent side walls having root sections bonded together near their base walls for increased strength. This is accomplished by scriving and cutting back a leading edge of one of the blade-shaped protrusions, such that the scrived leading edge leaves the root regions exposed so that the root regions bond together while the plastic material is hot.

9 Claims, 3 Drawing Sheets

U.S. PATENT DOCUMENTS

| | | | |
|---|---|---|---|
| 5,803,517 A * | 9/1998 | Shibuya | 293/120 |
| 6,082,792 A * | 7/2000 | Evans et al. | 293/133 |
| 6,174,009 B1 | 1/2001 | McKeon | |
| 6,179,353 B1 * | 1/2001 | Heatherington et al. | 293/122 |
| 6,179,355 B1 | 1/2001 | Chou et al. | |
| 6,231,095 B1 | 5/2001 | Chou et al. | |
| 6,247,745 B1 | 6/2001 | Carroll, III et al. | |
| 6,315,339 B1 | 11/2001 | Devilliers et al. | |
| 6,406,079 B1 | 6/2002 | Tamada et al. | |
| 6,406,081 B1 * | 6/2002 | Mahfet et al. | 293/133 |
| 6,443,513 B1 | 9/2002 | Glance | |
| 6,540,276 B1 * | 4/2003 | Azuchi et al. | 293/102 |
| 6,554,333 B1 | 4/2003 | Shimotsu et al. | |
| 6,575,510 B1 * | 6/2003 | Weissenborn | 293/121 |
| 6,669,251 B1 * | 12/2003 | Trappe | 293/120 |
| 6,672,635 B1 * | 1/2004 | Weissenborn et al. | 293/120 |
| 6,695,366 B1 * | 2/2004 | Cherry | 293/120 |
| 6,726,261 B1 * | 4/2004 | Goto et al. | 293/120 |
| 6,726,262 B1 * | 4/2004 | Marijnissen et al. | 293/121 |
| 6,848,730 B1 * | 2/2005 | Evans | 293/121 |
| 6,877,785 B1 * | 4/2005 | Evans et al. | 293/120 |
| 6,923,494 B1 * | 8/2005 | Shuler et al. | 296/187.06 |
| 2002/0017805 A1 | 2/2002 | Carroll, III et al. | |
| 2002/0149214 A1 * | 10/2002 | Evans | 293/120 |

FOREIGN PATENT DOCUMENTS

| | | |
|---|---|---|
| DE | 19522575 A1 | 1/1996 |
| DE | 19537186 A1 | 4/1996 |
| FR | 2747445 A1 | 4/1996 |

* cited by examiner

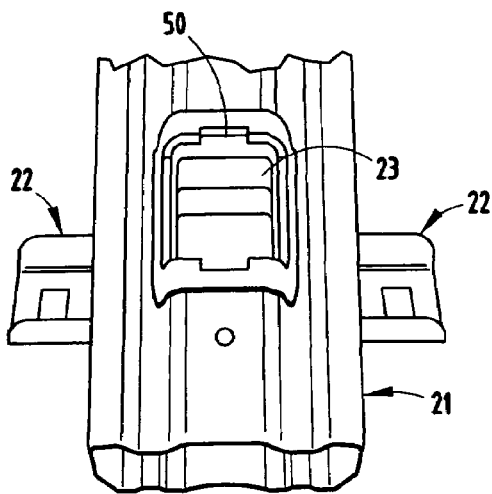
FIG. 5
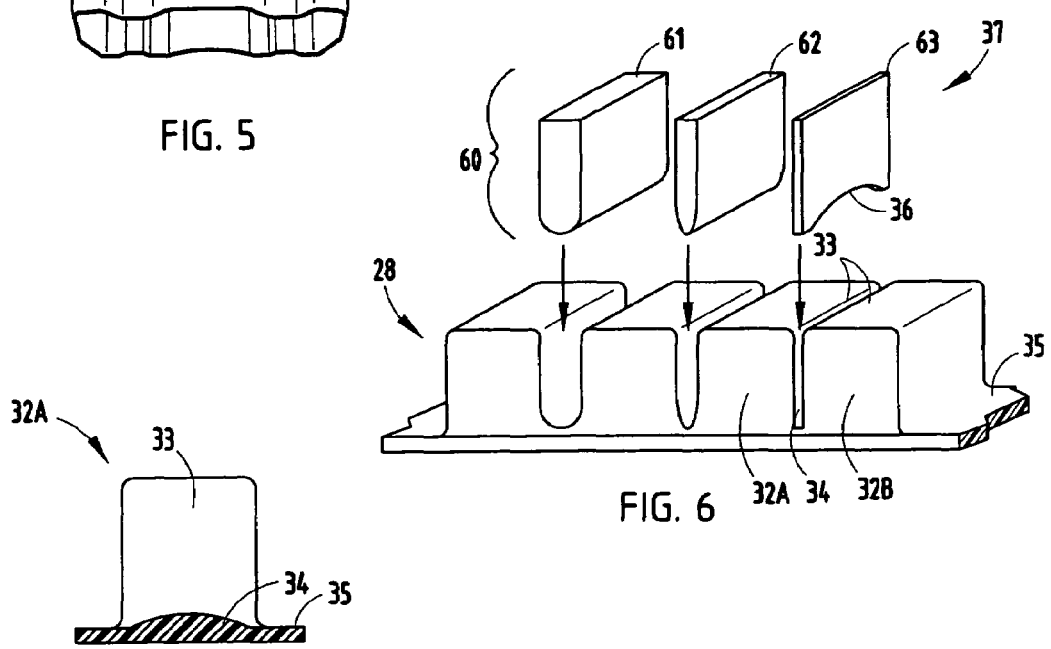
FIG. 6
FIG. 7
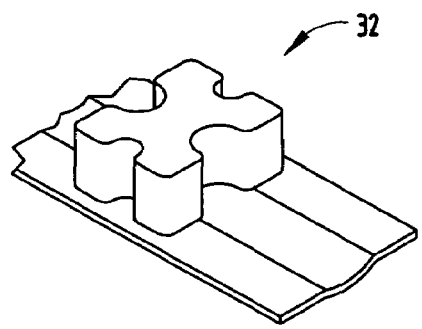
FIG. 8

BUMPER WITH CRUSH CONES AND ENERGY ABSORBER

BACKGROUND

The present invention relates to vehicle bumper systems adapted for energy absorption and having energy-absorbing mounts.

Energy management in the area of vehicle bumper mounts is critical for effective energy absorption during a vehicle crash. Often, bumper mounts are made heavy-duty to have sufficient strength to pass impact and functional bumper testing. However, this leads to substantial increased cost, wasted material, and increased weight. Also, bumper mounts are often made to collapse in particular ways and/or their impact stroke distances are increased to provide for substantial energy absorption prior to the impact affecting the vehicle's frame. However, these modifications also result in increased costs. It is desirable to provide improved crush strength and energy absorption in the area of bumper mounts, but without increasing the crush stroke and without substantially increasing the weight and complexity of the mounting area.

Bumper systems often have polymeric energy absorbers for providing initial energy absorption when a bumper system is impacted. Energy absorbers can be tuned to modify the force-deflection curve (i.e. energy absorption curve) for a given bumper system. For example, tuning may include thickening or thinning walls, and/or material substitution, and/or addition of more structure to the energy absorber. However, simpler and less intrusive methods are desired for tuning a bumper system.

Thus, a bumper system and related method having the aforementioned advantages and solving the aforementioned problems are desired.

SUMMARY OF THE PRESENT INVENTION

In one aspect of the present invention, a bumper system includes a tubular bumper beam having top, bottom, front, and rear walls, and further having a pair of mounts adapted for mounting the beam to a vehicle frame. A crush cone is positioned in front of each mount within the beam, each crush cone including a flange engaging the front wall and a tube section extending from the flange through a hole in the front wall into engagement with the rear wall.

In another aspect of the present invention, a bumper system includes a bumper beam having a face, and a thermoformed energy absorber positioned against the face. The energy absorber includes a base wall and at least two adjacent crush boxes formed into the base wall. The adjacent crush boxes include a pair of adjacent side walls each having a root section next to the base wall. The root sections are bonded together a distance away from the base wall such that the adjacent side walls reinforce and strengthen each other.

In still another aspect of the present invention, a method of forming an energy absorber comprises steps of providing a base sheet of thermoformable plastic material, heating the sheet, and providing a tool having a plurality of blade-shaped protrusions with leading edges for forming a plurality of crush boxes in the base sheet. The crush boxes include a pair of adjacent crush boxes. At least one of the leading edges is scrived and cut back along a center area so that when the base wall is being thermally formed by the blade-shaped protrusion, a center root region of adjacent side walls on the pair of adjacent crush boxes formed by the scrived leading edge are left exposed by the blade-shaped protrusion and are not cooled by the blade-shaped protrusion. The method further includes engaging the tool with the heated sheet, with the blade-shaped protrusions forming a plurality of crush boxes in the sheet. The blade-shaped protrusion with the scrived leading edge leaves the root regions exposed during the thermoforming process so that the root regions bond together while the plastic material is hot, which results in increased strength of the pair of adjacent crush boxes upon cooling of the sheet.

These and other aspects, objects, and features of the present invention will be understood and appreciated by those skilled in the art upon studying the following specification, claims, and appended drawings.

BRIEF DESCRIPTION OF DRAWINGS

FIG. 5 is a perspective end view of FIG. 4;

FIG. 6 is a perspective schematic view of a tool with blade-shaped protrusions for thermoforming the energy absorber shown in FIGS. 1–3;

FIG. 7 is a cross section view taken along the line VII—VII in FIG. 6; and FIG. 8 is a fragmentary perspective view of a crush box from FIG. 3.

DETAILED DESCRIPTION OF PREFERRED EMBODIMENTS

Figure 1:
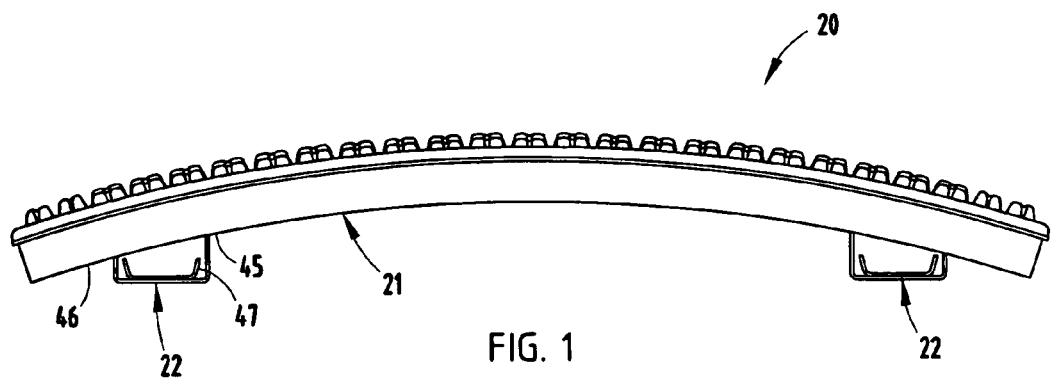
FIG. 1 is a perspective view of a bumper system embodying the present invention.

A bumper system 20 (FIG. 1) includes a tubular bumper beam 21 having a pair of mounts 22 for mounting to a vehicle frame and a crush cone 23 in front of each mount within the beam 21. Each crush cone 23 includes a flange 24 engaging a front surface of a front wall 25 of the beam 21 and includes a tube section 26 extending through the front wall 25 into engagement with a rear wall 27 of the beam 21. A thermoformed energy absorber 28 includes ridges 29 engaging horizontal channels 30 in the face surface of the front wall 25 and additional shallow recesses 31 receiving the flanges 24 of the crush cones 23. The energy absorber 28 is thermoformed to include a plurality of crush boxes 32. At least two crush boxes 32A–32B include adjacent side walls 33 having root sections 34 bonded together near their base walls 35 for increased strength. This is accomplished by scriving and cutting back a leading edge 36 of the protrusion 63 of the blade-shaped protrusions 37 (FIG. 6), such that the scrived leading edge 36 leaves the root regions 34 exposed during the thermoforming process so that the root regions 34 bond together while the plastic material is hot. This results in stronger stiffer crush boxes 32A–32B, which allows tuning of impact strength in particular areas of the energy absorber, and also allows a reduction in sheet thickness and material properties while still maintaining sufficient strength of the energy absorber. Notably, the scriving of the blade can be done on production tooling quickly, and does not require changing materials or sheet thicknesses, as described in more detail below. Also, it helps achieve a progressive crush upon impact.

Beam 21 (FIG. 1) is a tubular reinforcement with front and rear walls 25 and 27 connected by top and bottom walls 40 and 41. The beam 21 is longitudinally swept and curved to match an aerodynamic shape of a front of the vehicle for which it is intended. The front wall 25 defines a pair of vertically spaced channels 30. The illustrated beam 21 forms a single tube, however, it is contemplated that the present inventive concepts can be used on a double tube beam, C-shaped beam, or other beam shapes. An aperture 42 is formed in the front wall 25 at each end in alignment with the mounts 22 for receiving the tube section 26 of the crush cone 23, as discussed below. The mounts 22 comprise a bracket having inboard and outboard beam attachment flanges 45 and 46 welded to the rear wall 27 near outboard ends of the beam 21. A frame-attachment flange 47 extends between the bumper attachment flanges 45 and 46 and includes apertures for connection to a vehicle frame.

Figure 2:
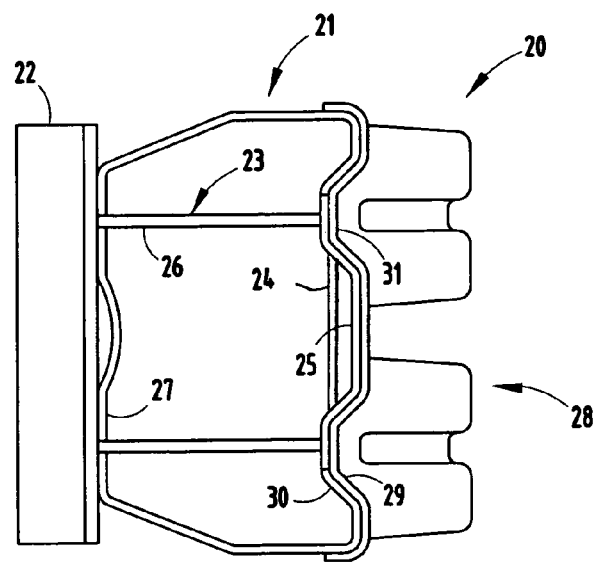
FIG. 2 is a cross section taken vertically through FIG. 1, and FIGS. 2A–2C are views identical to FIG. 2 but of individual components of the beam, the crush tube, and the energy absorber, respectively.

The crush cones 23 (FIG. 2B) each include a ring-shaped attachment flange 24 and a rearwardly-extending tube section 26. The attachment flange 24 has a shape that matably engages a front surface of the front wall 25 (FIG. 2) around the aperture 42. The flange 24 can be secured to the beam front wall 25 by mechanical means such as a fastener or tab 50 or molded in detents. The illustrated flange 24 defines a relatively square shape, although it is contemplated that other shapes may be used as well. The tube section 26 also defines a relatively square cross section, with radiused corners. The tube section 26 extends to the rear wall 27. It is contemplated that the tube section 26 can be terminated in different ways, depending upon the functional requirements of the bumper system. In the present arrangement, the tube section 26 abuts the rear wall 27 and includes a "floor" or bottom wall. However, it is contemplated that a bottom could be eliminated, if desired. The mount 22 does not include a flat plate welded to the rear wall 27 of the beam 21, but it is contemplated that one could be provided, if desired. The rear end of the tube section 26 can be welded to the rear wall 27 or left un-attached, as desired. The crush cones 23 communicate impact forces directly and immediately to the mounts 22 so that the vehicle frame (and vehicle occupants) will immediately begin to experience de-acceleration in reaction to the force. This has the benefit of spreading impact forces over a greater time period. (If impact forces had to collapse the energy absorber first before forces were communicated through to the vehicle frame, then their transmission to the vehicle would be delayed a few micro-seconds and the rise in impact forces communicated to the vehicle frame would be more dramatic and relatively sharp.) Notably, while the crush cones 23 communicate the impact energy to the vehicle frame relatively sooner than if the crush cones 23 were absent, the crush cones 23 are designed to crush and absorb energy. In other words, the crush cones 23 smooth out and provide a more immediate but gradual increase in impact energy communicated to the vehicle frame, while at the same time providing an energy absorbing function at the strategic location directly over the mounts 22 such that the force required to crush the beam section is tunable, enabling local change to achieve a desired vehicle impact pulse.

Figure 2A:
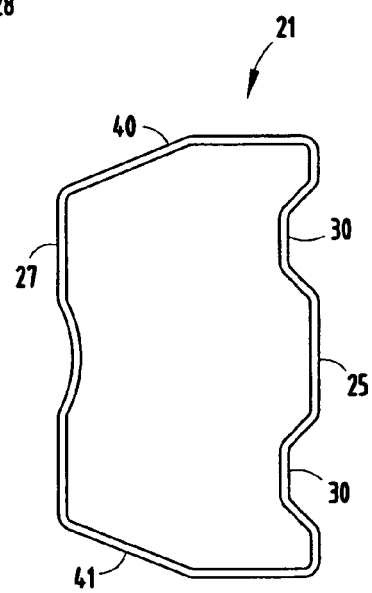
Figure 2B:
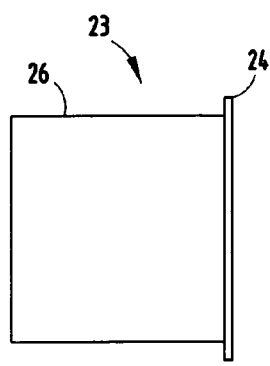
Figure 2C:
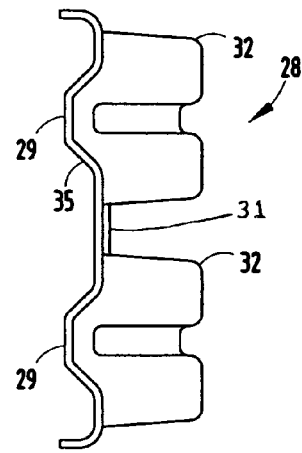
Figure 3:
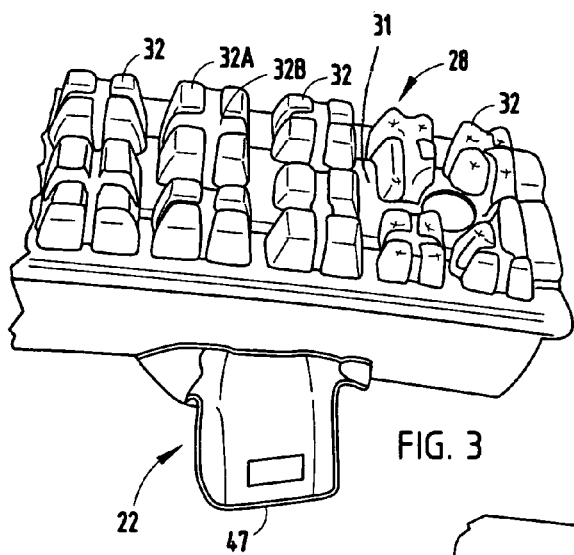
FIG. 3 is a fragmentary perspective view of an end section of the beam and energy absorber shown in FIG. 1.
Figure 4:
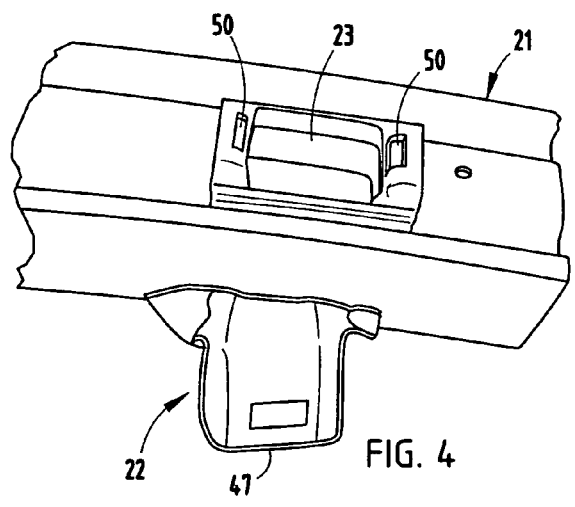
FIG. 4 is a fragmentary perspective view of an end section of the beam shown in FIG. 3.

The thermoformed energy absorber 28 (FIG. 2C) includes a base wall 35 from which the crush boxes 32 (and 32A and 32B, FIG. 6) are thermoformed, along with ridges 29 (FIG. 2C) which engage channels 30 in the beam 21 (FIG. 2A) and recesses 31 (FIG. 2) which receive flanges 24 in crush cones 23 (FIG. 2B). The crush boxes 32 are made to any depth, height, width, shape, density, and spacing desired for optimizing energy absorption in various regions of the bumper system. It is contemplated that the crush boxes will be made accordingly to known thermoforming technologies, such as by including radii along all corners to facilitate more uniform material flow during the thermoforming process. The side walls 33 of the crush boxes are relatively flat, but can also include undulations and waves intended to increase their stability and crush strength. It is noted that the energy absorber could be injection-molded, if desired. However, where the internal space between a beam 21 and a vehicle fascia is relatively small and/or the volumes are low, thermoformed energy absorbers may be more practical. An important property of the energy absorber 28 is that it can be tuned to selectively change energy absorption during bumper development, even after the tooling has been cut. This tuning can be done by material substitution, by changing walls thickness and radii, and by adding structure where needed. Also, tuning can be accomplished by scriving the blades in the thermoforming tooling, as noted below.

The present energy absorber 28 (FIG. 6) can be selectively tuned to have particular impact strengths in selected areas on particular crush boxes, as illustrated in crush boxes 32A and 32B. In crush boxes 32A and 32B, the adjacent side walls 33 include bonded root sections 34 for increased strength. This is accomplished by a method called "scriving" a blade-shaped protrusion. As shown in FIG. 6, the tool 60 for thermoforming a sheet into the energy absorber 28 includes a plurality of blade-shaped protrusions 37, including specific blade-shaped protrusions 61–63. Blade-shaped protrusions like the wide protrusion 61 can be cooled more easily than blade-shaped protrusions like protrusion 63 that are relatively narrow. This can be used to an advantage as follows. If the narrow blade-shaped protrusion 63 is scrived along a center of its leading edge 36, the result is that material from the base wall 35 that is stretched and thermally formed into the side walls 33 will have a tendency to draw together in the root sections 34. This action is assisted by the fact that narrower blade-shaped protrusions 37 are more difficult to cool than thicker blade-shaped protrusions, resulting in the material that contacts the narrower blade-shaped protrusions staying hotter. When the material is still hot and semi-fluid, the material at the root sections 34 will draw together and touch and potentially bond. This results in adjacent side walls 33 reinforcing and stabilizing each other, which results in a substantial increase in strength even though the side wall thickness has not been increased.

It is to be understood that variations and modifications can be made on the aforementioned structure without departing from the concepts of the present invention, and further it is to be understood that such concepts are intended to be covered by the following claims unless these claims by their language expressly state otherwise.

I claim:
1. A bumper system comprising:
   a tubular bumper beam having top, bottom, front, and rear walls, and further having a pair of mounts extending from the rear wall and adapted for mounting the beam to a vehicle frame; and
   a crush cone positioned in front of each mount, each crush cone including a laterally-extending attachment flange engaging and secured to the front wall and a tube section extending from the flange through a hole in the front wall into engagement with the rear wall.

2. A bumper system comprising:
a tubular bumper beam having top, bottom, front, and rear walls, and further having a pair of mounts extending from the rear wall and adapted for mounting the beam to a vehicle frame; and
a crush cone positioned in front of each mount, each crush cone including a flange engaging the front wall and a tube section extending from the flange through a hole in the front wall into engagement with the rear wall; and
an energy absorber engaging the front wall, the energy absorber includes a rear shape matably receiving the flange and that avoids interfering with the flange or the crush cone.

3. The bumper system defined in claim 2, wherein the rear shape defines a pocket for matably receiving the flange.

4. A bumper system comprising:
a tubular bumper beam having top, bottom, front, and rear walls, and further having a pair of mounts extending from the rear wall and adapted for mounting the beam to a vehicle frame; and
a crush cone positioned in front of each mount, each crush cone including a flange engaging the front wall and a tube section extending from the flange through a hole in the front wall into engagement with the rear wall; and
an energy absorber engaging the front wall, the front wall including at least one horizontally-extending channel, and the energy absorber including a ridge engaging the channel.

5. A bumper system comprising:
a bumper beam having a face; and
a thermoformed energy absorber positioned against the face, the energy absorber including a base wall and at least two adjacent crush boxes formed into the base wall, the adjacent crush boxes including a pair of adjacent side walls each having a abutting root sections located next to the base wall, the abutting root sections being bonded together a distance away from the base wall but short of a top of the adjacent crush boxes, such that the adjacent side walls reinforce and strengthen each other.

6. The bumper system defined in claim 5, wherein the crush boxes include a front wall and additional side walls that combine with the front wall and the adjacent side walls to form crushable energy-absorbing structures, at least one of the adjacent side walls and the additional side walls being non-planar and having undulations therein for increased strength and stability.

7. The bumper system defined in claim 5, wherein center regions of the abutting root sections are thermally bonded together at a location above outer regions of the abutting root sections.

8. A bumper system comprising:
a tubular bumper beam having top, bottom, front, and rear walls, and further having a pair of mounts extending from the rear wall and adapted for mounting the beam to a vehicle frame; and
a crush cone positioned in front of each mount, each crush cone including a ring-shaped attachment flange engaging the front wall and a tube section extending rearwardly from an inboard edge of the attachment flange through a hole in the front wall into engagement with the rear wall.

9. A bumper system comprising:
a tubular bumper beam having top, bottom, front, and rear walls, and further having a pair of mounts extending from the rear wall and adapted for mounting the beam to a vehicle frame; and
a crush cone positioned in front of each mount, each crush cone including an attachment flange secured to a front of the front wall and a tube section extending rearwardly from the attachment flange through a hole in the front wall into engagement with the rear wall, the attachment flange being located adjacent the hole and defining at least part of a ring shape around the hole.

* * * * *